United States Patent Office 3,211,742
Patented Oct. 12, 1965

3,211,742
PROCESS FOR PREPARING OXADIAZOLES
René Lenaers, Brussels, Belgium, assignor to Union Carbide Corporation, a corporation of New York
No Drawing. Filed Apr. 17, 1962, Ser. No. 188,245
5 Claims. (Cl. 260—307)

This invention relates to a process for preparing oxadiazoles. More particularly, this invention relates to a process for preparing 3,5-disubstituted-1,2,4-oxadiazoles.

3,5-disubstituted-1,2,4-oxadiazoles are useful as nematocides, insecticides, bactericides, fungicides, defoliants, and the like. Exceptionally well suited for use as nematocides are the halogenated 3,5-disubstituted-1,2,4-oxadiazoles such as, for example, 3-phenyl-5-trichloromethyl-1,2,4-oxadiazole and 3-methyl-5-trichloromethyl-1,2,4-oxadiazole. In addition, 3 - trichloromethyl - 5 - phenyl-1,2,4-oxadiazole is extremely toxic both to mite eggs and adult mites. Similarly, 3-trichloromethyl-5-methyl-1,2,4-oxadiazole possesses significant systemic and soil fungicidal activity as well as specific systemic insecticidal activity. Bactericidal properties are displayed by 3-phenyl-5-(5'-nitrofuryl)-1,2,4-oxadiazole and 3,5 - di(5' - nitrofuryl)-1,2,4-oxadiazole.

Furthermore, 3,5-disubstituted-1,2,4-oxadiazoles having a trihalomethyl substituent in the 5-position of the oxadiazole nucleus may be utilized as intermediates for the synthesis of pharmaceuticals, high polymers, and also water-insoluble dyes, since these substituents can be easily converted into hydroxyl, amino, hydrazino, and similar groups thus leading to oxadiazole derivatives having specific applicability.

These compounds are preparable by a two-step process involving the acylation of an amidoxime followed by cyclization, usually carried out at elevated temperatures. In addition to the obvious drawbacks of a two-step process such prior process meets with difficulties in the preparation of some amidoxime starting material (usually accomplished by reacting a nitrile with hydroxylamine). Furthermore, the cyclization does not always proceed readily, and in some instances the synthesis terminates at the acyl-amidoxime.

It is an object of this invention to provide a novel one-step process for synthesizing 3,5-disubstituted-1,2,4-oxadiazoles.

It is another object to provide a one-step process for synthesizing 3,5 - disubstituted - 1,2,4 - oxadiazoles which process does not require an acylating agent.

It is a further object to provide a one-step process for synthesizing 3,5 - disubstituted - 1,2,4 - oxadiazoles wherein the oxadiazole end-product is readily reclaimable from the reaction mixture.

It is a still further object to provide a one-step process wherein relatively pure 3,5-disubstituted-1,2,4-oxadiazoles are produced from relatively inexpensive starting materials.

Still other objects will become readily apparent from reference to the ensuing discussion and the illustrative examples.

The aforementioned objects are achieved by the process of the present invention which comprises contacting in an inert organic vehicle a substituted hydroxamyl halide with a nitrile at an elevated temperature, in an alkaline-free environment, and for a sufficient period of time to produce a 3,5-disubstituted-1,2,4-oxadiazole.

Schematically, the reaction proceeds as follows:

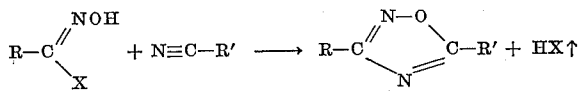

The gaseous HX produced during the reaction is removed by bubbling an inert sweeping gas such as nitrogen, helium, argon, xenon, carbon dioxide, or the like through the reaction mixture, by maintaining the reactants at a temperature of at least about 60° C., or by using both of the above methods simultaneously. Thus the remaining reaction product, the 3,5-disubstituted-1,2,4-oxadiazole, is obtained in a relatively pure state.

The hydroxamyl halides are characterized by the general formula:

(I) 

wherein R can represent alkyl, aryl, alkaryl, aralkyl, cycloalkyl, alkoxycarbonyl, heterocyclic having from 5 to 6 atoms in the heterocyclic nucleus, haloalkyl, haloaryl, haloalkaryl, haloaralkyl, halocycloalkyl, alkoxyalkyl, alkoxyaryl, aryloxyalkyl, acyl, guanidyl, the unit

wherein X is a halogen, and the unit

wherein X represents a halogen and Y represents a divalent saturated hydrocarbon having up to 18 carbon atoms, and the like.

By heterocyclic substituents are meant heterocyclic radicals containing from 5 to 6 atoms in the nucleus and containing from 1 to 3 hetero atoms in said nucleus such as nitrogen, oxygen, sulfur, and the like. In addition, the heterocycle can contain up to 10 atoms as a substituted moiety.

Illustrative R radicals in Formula I, above, include among others methyl, ethyl, n-propyl, iso-propyl, n-butyl, sec-butyl, t-butyl, the amyls, the hexyls, the heptyls, the octyls, the dodecyls, the octadecyls, phenyl, phenylpropyl, phenylbutyl, cyclopentyl, 2-propylcyclohexyl, cyclohexyl, 2-methylcyclohexyl, cycloheptyl, methoxycarbonyl, ethoxycarbonyl, furyl, furfuryl, chloromethyl, chloroethyl, bromopropyl, bromobutyl, methoxymethyl, ethoxyethyl, propoxymethyl, butoxypropyl, acetyl and the like.

Representative classes of compounds within the above characterization include aliphatic-substituted hydroxyamyl halides, haloaliphatic-substituted hydroxamyl halides, alicyclic-substituted hydroxamyl halides, haloalicyclic-substituted hydroxamyl halides, aromatic-substituted hydroxamyl halides, haloaromatic substituted hydroxamyl halides, alkoxycarbonyl-substituted hydroxamyl halides, acyl-substituted hydroxyamyl acid halides, heterocyclic substituted hydroxamyl halides and the like.

Typical reactants, among others, can be methyl glyoxalate chloroxime, ethyl glyoxalate chloroxime, propyl glyoxalate chloroxime, benzhydroxamic acid chloride, o-chlorobenzhydroxamyl chloride, p-methylbenzhydroxamyl chloride, p-methoxybenzhydroxamyl chloride, o-, m-, and p-nitrobenzhydroxamyl bromide, o-, m-, and p-nitrobenzhydroxamyl chloride, p-carboxybenzhydroxamyl chloride, p-carboxybenzhydroxamyl bromide, p-cyanobenzhydroxamyl chloride, cinnamohydroxamyl chloride, terephthalodihydroxamyl chloride, furohydroxamyl chloride, 5-nitrofurohydroxamyl chloride, pyruvhydroxamoyl chloride and the like.

The nitrile reactant is characterized by the general formula:

(II) $N \equiv C-R'$ wherein R' can represent radicals enumerated above as suitable substituents for Formula I with the exception of the units

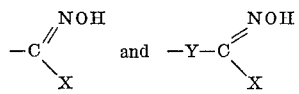

in lieu of which the units $-C\equiv N$ and $-Y-C\equiv N$ can be substituted.

Illustrative classes of compounds within the characterization of Formula II are aliphatic nitriles, alicyclic nitriles, aromatic nitriles, heterocyclic nitriles, haloaliphatic nitriles, haloalicyclic nitriles, haloaromatic nitriles, and the like.

Representative of the nitriles suitable for the instant invention are butyronitrile, valeronitrile, capronitrile, enanthonitrile, caprylonitrile, pelargonitrile, caprinitrile, hendecanentrile, lauronitrile, tridecanenitrile, myristonitrile, pentadecanenitrile, palmitonitrile, margaronitrile, stearonitrile, malonitrile, glutaronitrile, 3-butenonitrile, 4-pentenonitrile, 2-hexenonitrile, 2-hepteno-nitrile, glycolonitrile, hydracrylonitrile, epicyanohydrin, lactonitrile, pyruvonitrile, cyclohexanecarbonitrile, o-toluonitrile, m-toluonitrile, p-toluonitrile, p-bromobenzonitrile, 1-naphthonitrile, 2-naphthonitrile, isophthalonitrile, terephthalonitrile, mandelonitrile, amygdalin, o-benzene-diacetonitrile, picolinonitrile, nicotinonitrile, isonicotinonitrile, furnacetonitrile, trichloroacetonitrile, and the like.

The reactants are contacted in the presence of an inert, normally liquid, organic vehicle such as, for example, aromatic solvents, e.g., benzene, toluene, xylene, ethylbnezene, chlorobenzene, and the like; various oxygenated organic liquids such as anisole, dioxane, the dimethyl and diethyl ethers of ethylene glycol, of propylene glycol, of diethylene glycol, and the like; alcohols such as methanol, ethanol, the propanols, and the like; normally liquid saturated hydrocarbons including the open chain, cyclic, and alkyl-substituted cyclic saturated hydrocarbons such as pentane, hexane, heptane, various normally-liquid petroleum hydrocarbon fractions, cyclohexane, the alkylcyclohexanes, decahydronaphthalene, and the like.

The hydroxyamyl halide and the nitrile can be reacted in a wide range of proportions. Generally, molar ratios in the range from about 10:1 to about 1:10 can be employed. A molar ratio of about 1:1 of the hydroxamyl halide to the nitrile is preferred since this facilitates the recovery of the desired end product.

The process of this invention can be conducted over a wide temperature range. The reaction temperature is governed by the vehicle employed (usually at about the reflux temperature of the vehicle), the method employed for removal of gaseous hydrohalides generated during the reaction, and other practical considerations such as the nature of the reactants, decomposition temperatures of the reactants and the end-products, etc. Depending on the hereinabove enumerated factors the temperature may be as low as about 40° C., and lower, and as high as 150° C., and higher. A preferred temperature range is between about 60° C. and about 140° C.

The reaction normally takes place at atmospheric pressure. However, in the interests of lowering the reflux temperature of the reactant-containing vehicle, the reaction may be carried out at reduced pressure with equally effective results.

The reaction is completed when no more hydrogen halide is given off. The product is then reclaimed from the reaction mixture by conventional methods.

The process of the instant invention will now be further illustrated by the following examples.

*Example I*

To a reaction vessel were charged 15.5 grams of benzhydroxamyl chloride and 10.3 grams of benzonitrile, both dissolved in 100 cc. of toluene. The resulting solution was refluxed at atmospheric pressure until evolution of HCl stopped (for about 6 hours). Solvent was evaporated from the solution at a reduced pressure and the residue crystallized out of a water-alcohol mixture. 3,5-diphenyl-1,2,4-oxadiazole (M.P. 109° C.) was obtained in 55% yield.

*Example II*

To a reaction vessel were charged 23.3 grams of terephthalodihydroxamyl chloride and 20.6 grams of benzonitrile, both dissolved in 200 cc. of toluene. The resulting solution was refluxed for about 24 hours at atmospheric pressure while gaseous $CO_2$ was bubbled through the reaction mixture. One half of the solvent was evaporated and the reaction product filtered. 1,4-bis-(5'-phenyl oxadiazolyl)-benzene (M.P. 277° C.) was obtained in 77% yield as pale yellow crystals.

Analysis (calculated for $C_{22}H_{14}O_2N_4$):

|  | C | H | O |
| --- | --- | --- | --- |
| Calculated (percent) | 72.20 | 3.83 | 8.52 |
| Found (percent) | 71.61 | 3.90 | 8.94 |

*Example III*

19.7 grams of trichloroacetohydroxamyl chloride and 10.3 grams of benzonitrile were dissolved in 100 cc. of toluene, and the resulting solution was refluxed for 24 hours at atmospheric pressure while nitrogen was bubbled through the reaction mixture. The solvent was evaporated and the residue distilled under reduced pressure (boiling point 105–106° C. at 0.2 mm. of Hg). 3-trichloromethyl-5-phenyl-1,2,4-oxadiazole was obtained as an oil-like substance which immediately solidified as colorless crystals melting at 70° C. (yield 7%). This product was identified by means of infra-red spectroscopy. The identity of the compound was further substantiated by the mixed melting point method whereby a portion of the prepared compound was mixed with a portion of the compound prepared by the prior art method and the melting point of the mixture determined. No change in the melting point was observed.

*Example IV*

To a reaction vessel were charged 10.3 grams of benzhydroxamyl chloride and 14.45 grams of trichloroacetonitrile, both dissolved in 100 cc. of toluene, and the resulting solution was refluxed for 24 hours at atmospheric pressure while nitrogen was bubbled through the reaction mixture. The solvent was evaporated and the residue distilled under reduced pressure (boiling point 91–92° C. at 0.02 mm. of Hg). 3-phenyl-5-trichloromethyl-1,2,4-oxadiazole was obtained as a colorless oil-like substance, which crystallized on cooling (M.P. 24.5 C.; yield 65%). The compound was identified by its infra-red spectrum.

*Example V*

To a reaction vessel were charged 7.7 grams of benzhydroxamyl chloride and 4.2 grams of cyanoguanidine, both dissolved in 100 cc. of ethanol, and the resulting solution was refluxed for about 3 hours at atmospheric pressure. A precipitate was formed. The reaction mixture was cooled down and filtered. The filtrate was evaporated by dryness and the residue washed with water. The obtained solid product was crystallized from hot pyridine. The crystals formed on cooling were filtered and identified as 3-phenyl-5-guanidyl-1,2,4-oxadiazole (M.P. 270° C.; yield 81%).

Analysis (calculated for $C_9H_9ON_5$):

|  | C | H | O |
| --- | --- | --- | --- |
| Calculated (percent) | 53.20 | 4.43 | 7.90 |
| Found (percent) | 53.10 | 4.49 | 8.30 |

Example VI

To a reaction vessel were charged 14 grams of ethyl glyoxalate chloroxime and 8.5 grams of cyanoguanidine, both dissolved in 100 cc. of ethanol, and the resulting solution was refluxed for about 4 hours at atmospheric pressure. The precipitate formed in the solution was filtered off, recrystallized in a mixture of pyridine-ether, and identified as 3-carboxyethyl-5-guanidyl-1,2,4-oxadiazole (M.P. 280° C., with decomposition). The yield was about 16%.

Analysis (calculated for $C_6H_9O_3N_5$):

|  | C | H | N |
|---|---|---|---|
| Calculated (percent) | 36.20 | 4.55 | 35.20 |
| Found (percent) | 36.63 | 4.72 | 35.19 |

Example VII

To a reaction vessel were charged 15.5 grams of benzhydroxamyl chloride and 13.8 grams of 2-cyano-5-nitrofurane, both dissolved in 100 cc. of toluene. The resulting solution was refluxed for 24 hours at atmospheric pressure while nitrogen was bubbled through the reaction mixture. One half of the solvent was then evaporated, the remainder filtered, and recrystallized in benzene. 3-phenyl-5-(5'-nitrofuryl)-1,2,4-oxadiazole was obtained in 70% yield (M.P. 168° C.) as yellow crystals.

Analysis (calculated for $C_{12}H_7O_4N_3$):

|  | C | H | O |
|---|---|---|---|
| Calculated (percent) | 56.02 | 2.72 | 24.90 |
| Found (percent) | 56.13 | 2.69 | 24.88 |

Example VIII

To a reaction vessel were charged 15.5 grams of benzhydroxamyl chloride and 10.4 grams of p-cyano-pyridine, both dissolved in 100 cc. of toluene. The resulting solution was refluxed for 24 hours at atmospheric pressure, while nitrogen was bubbled through the reaction mixture. Two thirds of the solvent were evaporated and the remainder filtered and recrystallized from benzene. 3-phenyl-5-p-pyridyl-1,2,4-oxadiazole was obtained in 63% yield. (M.P. 155° C.).

Analysis (calculated for $C_{13}H_9ON_3$):

|  | C | H | O |
|---|---|---|---|
| Calculated (percent) | 69.96 | 4.04 | 7.17 |
| Found (percent) | 69.72 | 4.06 | 7.32 |

Example IX

To a reaction vessel were charged 15.5 grams of benzhydroxamyl chloride and 8.3 grams of isobutyronitrile, both dissolved in 100 cc. of toluene. The solution was refluxed for 24 hours at atmospheric pressure, while nitrogen was bubbled through the reaction mixture. The solvent was evaporated and the residue distilled under reduced pressure (boiling point 83-84° C. at 0.04 mm. of Hg). 3-phenyl-5-isobutyl-1,2,4-oxadiazole was obtained as colorless oil-like substance in about 26% yield. The product was identified by reference to its infra-red spectrum.

Example X

To a reaction vessel were charged 19 grams of nitrofurohydroxamyl chloride and 13.8 grams of 2-cyano-5-nitro-furan, both dissolved in 250 cc. of toluene. The solution was refluxed for about 24 hours at atmospheric pressure while nitrogen was bubbled through the reaction mixture. The solvent was evaporated to dryness under reduced pressure. The residue was extracted with chloroform, leaving an insolubled black tar. The resulting solution was evaporated and the dry residue recrystallized from acetic acid-ether mixture and identified as 3,5-dinitrofuryl-1,2,4-oxadiazole (M.P. 171° C.; yield 25%).

Analysis (calculated for $C_{10}N_4O_7N_4$):

|  | C | H | O |
|---|---|---|---|
| Calculated (percent) | 41.10 | 1.37 | 38.40 |
| Found (percent) | 40.94 | 1.42 | 38.46 |

Example XI

To a reaction vessel were charged 7.75 grams of benzhydroxamyl chloride and 3.75 grams monochloroacetonitrile both dissolved in 50 cc. of toluene. The solution was refluxed for 24 hours at atmospheric pressure while nitrogen was bubbled through the reaction mixture. The solvent was evaporated and the reaction distilled under reduced pressure (boiling point 114° C. at 1.1 mm. of Hg). 3-phenyl-5-monochloromethyl - 1,2,4 - oxadiazole was obtained in a 70% yield as a slight yellow oil which crystallized on cooling (melting point: 38° C.). The product was identified by reference to its infra-red spectrum.

I claim:

1. The process comprising contacting, at a temperature of from 60° C. to 140° C., benzhydroxamyl chloride with trichloroacetonitrile, in an inert, alkaline-free organic solvent for a period of time sufficient to produce a 3-phenyl-5-trichloromethyl-1,2,4-oxadiazole.

2. The process comprising contacting, at a temperature of from 60° C. to 140° C., trichloroacetohydroxamyl halide with benzonitrile, in an inert, alkaline-free organic solvent for a period of time sufficient to produce a 3-trichloromethyl-5-phenyl-1,2,4-oxadiazole.

3. The process comprising contacting, at a temperature of from 60° C. to 140° C., benzhydroxamyl halide with 2-cyano-5-nitrofuran, in an inert, alkaline-free organic solvent for a period of time sufficient to produce a 3-phenyl-5-(5'-nitrofuryl)-1,2,4-oxadiazole.

4. The process of claim 1 where the solvent is toluene.

5. The process of claim 2 where the solvent is toluene.

References Cited by the Examiner

Elderfield, Heterocyclic Compounds, volume 7 (New York, 1961), pages 514–516.

NICHOLAS S. RIZZO, *Primary Examiner.*